United States Patent
Brown et al.

[11] Patent Number: 5,458,843
[45] Date of Patent: Oct. 17, 1995

[54] PIN-LESS DROOL PREVENTION SYSTEM

[75] Inventors: David Brown, Brampton; Nick Travaglini, Woodbridge, both of Canada

[73] Assignee: Tradesco Mold Limited, Rexdale, Canada

[21] Appl. No.: 334,837

[22] Filed: Nov. 4, 1994

Related U.S. Application Data

[63] Continuation-in-part of Ser. No. 893,862, Jun. 5, 1992, abandoned, which is a continuation-in-part of Ser. No. 544,453, Jun. 27, 1990, Pat. No. 5,229,145.

[51] Int. Cl.$^6$ ............................. B29C 45/27; B29C 45/32
[52] U.S. Cl. .................... 264/297.2; 264/328.8; 264/328.9; 425/567; 425/572; 425/588
[58] Field of Search .................. 264/328.1, 328.14, 264/328.15, 328.16, 328.8, 297.2, 328.9, 328.11; 425/562, 563, 564, 565, 568–570, 572, 575, 588, 567

[56] References Cited

U.S. PATENT DOCUMENTS

| | | |
|---|---|---|
| 2,770,011 | 11/1956 | Kelly . |
| 3,020,591 | 2/1962 | Breher et al. . |
| 3,295,169 | 1/1967 | Moslo . |
| 3,533,594 | 10/1970 | Segmüller .................... 249/107 |
| 3,540,524 | 11/1970 | Bachelier ..................... 164/303 |
| 3,743,469 | 7/1973 | Gibbons ....................... 425/450 |
| 3,806,295 | 4/1974 | Gellert ......................... 425/245 |
| 3,843,294 | 10/1974 | Bielfeldt et al. .............. 425/247 |
| 3,934,626 | 1/1976 | Hall ............................ 141/117 |
| 4,207,051 | 6/1980 | Wright et al. ............... 425/556 |
| 4,212,626 | 7/1980 | Gellert ......................... 425/562 |
| 4,309,163 | 1/1982 | Cottancin ..................... 425/543 |
| 4,345,890 | 8/1982 | Hemmi et al. ................ 425/143 |
| 4,400,341 | 8/1983 | Sorensen .................... 264/328.8 |
| 4,473,347 | 9/1984 | Terashima .................... 425/562 |
| 4,477,242 | 10/1984 | Eichlseder et al. ........... 425/207 |
| 4,539,171 | 9/1985 | Sorensen .................... 264/328.8 |
| 4,586,887 | 5/1986 | Gellert ......................... 425/144 |
| 4,599,064 | 7/1986 | Landis et al. ................ 425/185 |
| 4,663,811 | 5/1987 | Gellert .......................... 29/157 |
| 4,669,971 | 6/1987 | Gellert ......................... 425/549 |
| 4,971,747 | 11/1990 | Sorensen .................... 264/297.2 |
| 5,229,145 | 7/1993 | Brown et al. ................ 425/588 |
| 5,370,523 | 12/1994 | Kushnir ....................... 425/588 |

FOREIGN PATENT DOCUMENTS

| | | | |
|---|---|---|---|
| 51-102047 | 9/1976 | Japan | 425/565 |
| 52-25859 | 7/1977 | Japan | 425/565 |
| 58-14728 | 1/1983 | Japan | 425/588 |
| 478513 | 3/1992 | Japan | 425/588 |

Primary Examiner—Jill L. Heitbrink
Attorney, Agent, or Firm—Caesar, Rivise, Bernstein, Cohen & Pokotilow, Ltd.

[57] ABSTRACT

A multi-level stacked mold having at least two and as many as four levels of cavities has a stock distribution mold block centred axially of the stacked mold blocks, the axially extending stock inlet passage to the distribution block connecting with radially off-set stock transfer passages that cross the axially openable mold block interfaces, into the adjoining mold blocks. These openable stock transfer passages, are each provided at their respective, non-encapsulated, radially off-set, opening interfaces with a valveless anti-drool arrangement. The mold flow passage system is subject to continual, extreme, thermal cycling and cyclical mechanical loading, during the repeated opening-and-closing cycles of the mold. Each separable anti-drool sealing interface has a relatively axially displaceable portion extending to bridge the initial gap opening between adjacent mold blocks and serving as an expansible piston means. This extension of the displaceable "expansible piston means" portion is pressure responsive and serves to increase the internal volume of the adjacent transfer passage, while permitting equalizing the pressure of stock in the passage to atmospheric pressure, thus reducing the likelihood of the drooling of liquid plastic into the opening interspace, or the induction of atmospheric air into the flow passages.

23 Claims, 6 Drawing Sheets

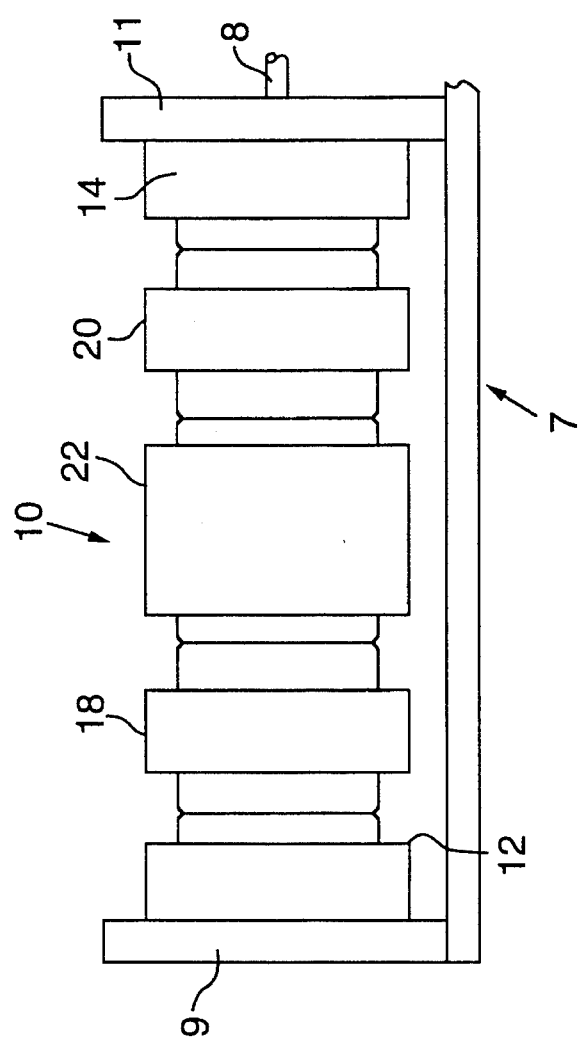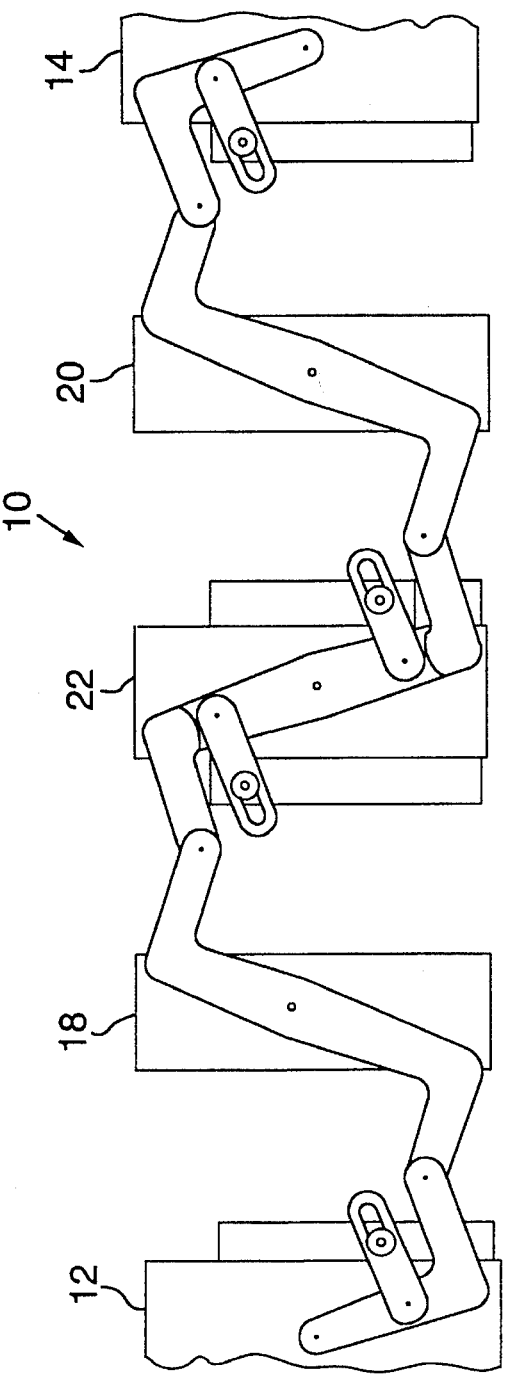

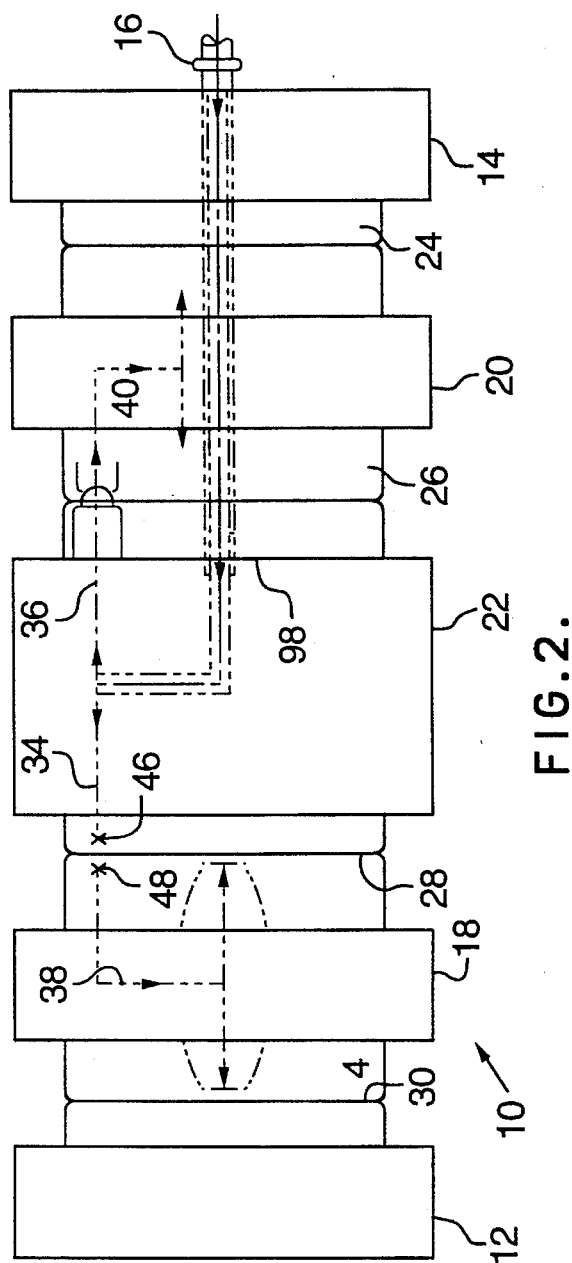
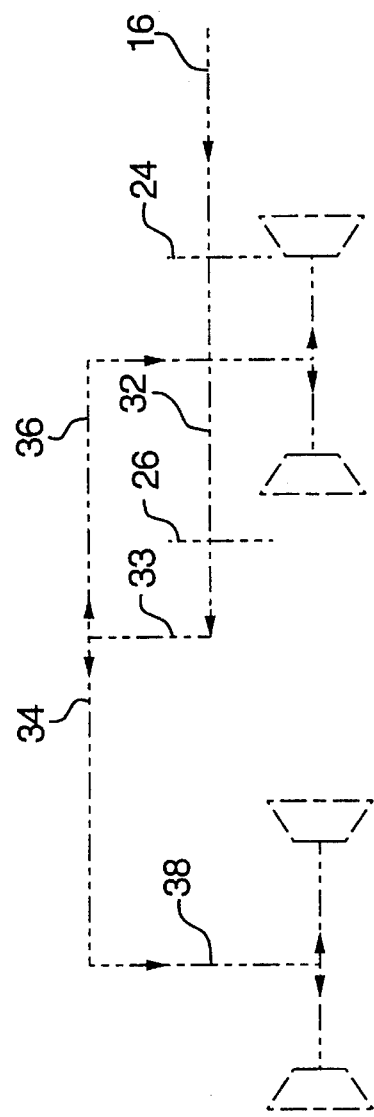
FIG. 2.
FIG. 3.

PIN-LESS DROOL PREVENTION SYSTEM

This application is a Continuation-in-Part of application Ser. No. 07/893,862 filed Jun. 5, 1992, now abandoned, which is a Continuation-in-Part of application Ser. No. 07/544,453, filed Jun. 27, 1990, now U.S. Pat. No. 5,229,145.

TECHNICAL FIELD

This invention is directed to a plastic mold system and in particular to an interface sealing system.

BACKGROUND ART

The use of cavity die molds has progressed from the use of single cavity dies, through multi-cavity dies; the use of 2-level synchronized stacked mold arrangements, to the use of 4-level desynchronized stacked molds, as taught by Sorensen in U.S. Pat. No. 4,971,747. Sorensen teaches the use of a reciprocal stacked 4-level molding system having an asymmetrical stock flow path feeding the respective "left" and "right" sides of the mold stack (relative to the mold centreline), with plastic material being injected first to one of the sides of the stack, and, after that side has set-up, opening the mold interface to eject the contents of the respective cavities while closing another mold interface and injecting stock into the other side of the stack.

In Sorensen (U.S. Pat. No. 4,971,747) as in certain of the below listed prior art patents, numerous stock flow control valves are shown, in Sorensen's multirunner stock feed. These stock system flow control valves may be used, among other things, for the purpose of preventing the drool of liquid stock into the immediate zone of the mold interfaces. The occurrence of such drooling is most disadvantageous to the operation of any type of mold, and can lead to significant spoilage losses of finished product, and/or mold damage, while also causing cycle interruption and consequent loss of production. Sorensen also uses a snorkel of fixed stroke, which may lead both to stock spillage and air entrainment in its operation.

The illustrative prior art patents are as follows:

| U.S. PAT. NO. | ISSUE DATE | INVENTOR |
| --- | --- | --- |
| 2,770,011 | November 1956 | Vely |
| 3,533,594 | October 1970 | Segmuler |
| 3,806,295 | April 1974 | Gellert |
| 3,843,294 | October 1974 | Bielfeldt et al. |
| 3,934,626 | January 1976 | Hall |
| 4,207,051 | June 1980 | Wright et al. |
| 4,212,626 | July 1980 | Gellert |
| 4,309,163 | January 1982 | Cottancin |
| 4,473,347 | September 1984 | Terashima |
| 4,477,242 | October 1984 | Eichlseder et al. |
| 4,586,887 | May 1986 | Gellert |
| 4,599,064 | July 1986 | Landis et al. |
| 4,663,811 | May 1987 | Gellert |
| 4,669,971 | June 1987 | Gellert |
| 4,971,747 | November 1990 | Sorensen |

| JAPANESE PATENT NO. | | INVENTOR |
| --- | --- | --- |
| 51-102 047 | | Kokai |

The Japanese Kokai 51-102 047 shows in one embodiment an injection nozzle located external to the press and located upon the mold centre axis. The axial single expansion of the one-piece nozzle construction is spring-driven, to a fixed, full stroke, with no regard to resultant internal stock pressure, which can become less than atmospheric, such that air induction is possible. The spring loading of the nozzle is added to the clamping tonnage force. Adjustments may be applied thereto externally of the press, with virtually no limitation upon accessability or available space. Any variations in nozzle geometry due to changing thermal conditions can be accommodated by compensatory displacement of the press injection nozzle. The arrangement is located symmetrically on the mold axis, and is entirely insensitive, with no unbalancing effect on mold opening and closing.

In a second embodiment the one-piece nozzle arrangement is shown to provide direct injection, into a mold cavity, and comprises a symmetrical, off-centre nozzle which does not separate from the back of the mold into which it is injecting.

DISCLOSURE OF THE INVENTION

In accordance with the present invention there is provided a stacked, synchronized injection mold system suitable for use with a plurality of two, four or more levels of cavities in mutual axially stacked relation, and having a unitary stock flow system.

In a mold system according to the present invention, an embodiment having a stacked injection mold containing at least 4-levels of mold cavities in a plurality of mold blocks has stock feed distribution means which include a feed block located intermediately of the mold blocks to receive fluent feed stock from a stock injection head, and stock passage means connecting the feed block with the injection head and the mold blocks, in use to simultaneously transfer stock to the mold cavities from the injection head.

In one embodiment the stock feed distribution has a central feeder coincident with the polar axis of the mold and connecting with the feed block, which is located in the middle of the mold blocks.

The central feeder connects outwardly through the feed block to a series of radially outwardly located stock transfer passages. Each axially extending stock transfer passage connects with a mold cavity by way of a lateral runner passage. The stock transfer passages each cross a mold interface, so that the passages are opened at the interfaces each time the machine cycles and the respective interfaces of the mold stack open and close.

The separable mold stack may thus include a separable stock feed passage interface, movable in use from a closed, compressed, sealed condition during operation of the mold to an open, unsealed and spaced apart condition upon opening of the mold. The stock passage interface connector is located adjacent the outer periphery of the mold, and is subject to significant heating and cooling for each cycle of operation, due to passage of the hot plastic, which also generates shear energy, with consequent heating of the mold passages to produce continuous and somewhat extreme thermal cycling of the mold passages during the operating cycles of the mold.

The feed connectors, which are self adjusting, are arranged to provide relatively restricted spring forces, in view of their location at radially-outer positions, and because the reaction forces exerted by each feed connector's actuating spring is eccentric to and works in opposition to the clamping tonnage force applied by the press. In this way the generation of significant deflection or interface distortion of the mold is avoided.

The spring-driven portion of the feed connectors provide compensation for manufacturing tolerances, and any cumulative effects of mold wear.

The short initial travel supplied by the restricted spring is supplemented by a pressure responsive piston-and-cylinder action of a second, relatively movable portion of the separable feed connector, so as to continue to extend the connector into the gap of the opening interface, in response to the internal pressure of the feed. This extension action results in reduction of the feed pressure, such that, upon the feed pressure reducing to atmospheric pressure the travel of the connector ceases, to give a pressure balanced, self-adjusting travel.

During opening of a mold interface the spring-loaded first portion of the feed connector takes up the initial gap across the interface, while simultaneously providing initial acceleration into the opening interface-gap of the piston-driven second portion of the feed connector.

This limited, pressure responsive, self-adjusting travel of the connectors thus substantially precludes the induction of air into the transfer passages, while at the same time substantially preventing drooling of feed material into the opening mold interfaces.

It will be noted that when the mold is closed, the spring loading of the interface connectors maintains a seal, but is limited, to avoid both the generation of significant bending forces along the mold main parting line and unbalanced closing forces acting across the mold, to thereby avoid the danger of serious damage to the mold and the generation of shorts and flash, which would constitute unacceptable product.

Whereas in the invention disclosed in the above identified parent application (Ser. No. 07/544,453) the stock feed system incorporates a drool prevention valve with a shut-off pin, it has been found that the mold may be satisfactorily operated without the provision of such anti-drool shut-off pins, without necessarily incurring drooling into the inter-block spaces.

The use of self-adjusting feed connectors at the opening interfaces, with pre-set adjustable initial spring forces avoids the application of large deforming forces to the mold interfaces.

Thus there is provided a mold having a separation interface where a first mold portion separates axially from a second mold portion, the mold having stock feed passage means crossing the mold interface when the mold is closed, in stock feed transfer relation between the two mold portions; the stock feed passage means having a first passage portion movable with the first mold portion, a second passage portion movable with the second mold portion, a feed connector part of the second stock feed passage means being movable relative to the second mold portion in axially displaced relation therewith in response to spring force acting against the movable part, on the removal of mechanical restraint thereagainst by the aforesaid first portion, in use to diminish the gap opening at the interface when the mold portions separate.

There may also be provided a second portion of the feed connector part, movable relative to the other, first portion of the feed connector part, to further diminish the gap.

Further, the present invention provides a stacked mold construction subject to variations in the axial length thereof, the mold having an interface whereat a first passage portion of the mold stock feed passage means separates from an adjoining second passage portion, upon opening of the mold; one of the passage portions having a relatively axially movable third portion mounted in sealing relation therewith, to normally make axial sealing contact with the other passage portion when adjoined thereto; and axially compressible resilient means in pre-loaded relation with the relatively movable part, whereby, on closure of the mold a predetermined, progressively increasing load is applied between the first and the second stock passage means, to provide a resilient stock sealing connection therebetween.

The invention thus provides a gap-spanning arrangement within a mold, having a feed conducting connector member for conducting liquid plastic across the gap, and axially compressible resilient loading means positioned in pre-loaded compressive relation with the conducting member, to maintain sealing relation between the conducting member and an adjoining mold portion during the mold injection cycle while avoiding undue opening forces at the interfaces.

The second portion of the feed connector member is preferably a fluid pressure responsive, hollow piston means, axially movable in response to the excess of fluid pressure above atmosphere of fluent plastic within the feed connector.

Upon movement of the adjoining mold interfaces towards an open position the resilient loading means, in the form of springs, provides an initial impulse to the feed connectors to move in connected relation with the opposed opening mold face to span the initial gap.

The motion of the feed connector second portion, under the influence of fluent plastic at above atmospheric pressure, is maintained, relative to the first portion of the connector, until pressure equilibrium is reached. Under these conditions the occurrence of over-extension of the feed connector member is avoided, such that there is substantially no induction of air into the stock distribution system.

The invention thus provides a method of maintaining a substantially leak-free flow of plastic within an apparatus subject to cyclic differential thermal expansion in its cycles of operation, having an internal flow passage for the displacement of fluid plastic therethrough, with a movable feed connector portion of said passage abutting an adjacent portion in mutually compressed sealing relation, including the step of applying a resilient mechanical pre-load to said movable passage portion, to maintain said compressed sealing relation during thermal fluctuations of an injection cycle, while avoiding the application of undue force in a mold-opening direction, applied in a face-opening, mold deforming relation.

The aforesaid pre-load is preferably applied by a limited spring means.

The pre-load may be supplemented by the application of pressure fluid to expansible piston means, in load applying relation with the movable passage portion, and to provide supplemental extension to the movable passage portion to an extent when the internal pressure of the fluent plastic feed diminishes to atmospheric pressure.

The invention thus provides, in a mold for molding thermoplastic material, having an internal passage therein for the cyclic passage of hot fluent plastic therethrough, a movable portion of the passage abutting an adjacent passage portion, in mutually compressed sealing relation; mechanical compression means located adjoining the movable passage portion, to load the movable passage portion in predetermined compressive relation with the adjoining portion.

The mechanical compression means may include precompressed spring means in compressive relation with the movable passage portion.

The mechanical compression means may also include piston means axially displaceable by pressure fluid in compressive loading of the passage movable portion with the adjacent passage portion. The preferred pressure fluid comprises the plastic feed material. The residual pressure thereof, upon termination of the injection cycle and expansion of the piston means falling to atmospheric pressure, with consequent termination of piston displacement. This automatic pressure balancing effect prevents undue travel of the feed connector which in turn minimizes the entrainment of air into the feeder passages.

In one embodiment the present invention provides a mold having at least one mold block; stock feed passage means connected in stock feeding relation with the mold block, the stock feed passage means having a separable sealing interface, the separable interface having a first passage portion, a second passage portion adjacent the first passage portion and movable relative thereto to change the distance therebetween; and a third passage portion secured in sealing relation with one of the aforesaid passage portions, being relatively movable in regard thereto towards and away from the other of the aforesaid passage portions, and forming the aforesaid separable sealing interface therewith when secured thereto; the third passage portion having a pressure surface therein exposed to fluid pressure acting internally of the stock feed passage means and acting, in use, to displace the third passage portion in extending relation towards the other aforesaid passage portion, until mechanically constrained, or until the pressure is dissipated.

The combination thus provided comprises a stacked mold for use within a mold press, the mold having an axially centrally located stock distribution block flanked on each side by a mold block containing a pair of die molds positioned in mutual back to back relation; synchronized mold displacement means for simultaneously opening each of the mold levels on completion of a molding cycle; stock distribution passage means located radially outwardly from the main axis of the mold, having a separable sealing interface between each aforesaid mold block, and resilient interface loading means to provide a progressively applied load to the aforesaid separation interface of each mold block on closure of the mold press.

In a preferred embodiment the resilient loading means includes compression spring means for applying axial closure loading compensation to compensate for variations in mold axial length, due generally to thermal expansion and differences in manufacturing tolerances. Such thermal expansion are of an order that may exceed 30 thousandths of an inch.

There may be further provided adjustment means for adjusting the extent of initial precompression applied to the compression spring means acting when the mold is in closed condition.

In one embodiment Belleville spring disc washers have been found to make satisfactory compression spring means.

Thus it has, unexpectedly, been found that a simple arrangement of movable interfacial feed connector connections can, in many instances, ensure satisfactory operation of the mold, to provide a pin-less connector wherein there is no movable shut-off pin to physically interrupt the flow of molten stock.

The present invention thus provides a method of operating a mold having a separation interface whereat a first mold portion separates axially from an opposed second mold portion, the mold having stock feed passage connector means crossing the interface in stock feed transfer relation between the first and the second mold portions, the stock feed passage means being located in remote, radially outwardly spaced relation from the mold (polar axis) centreline, and having an air-exposed separation interface upon the opening thereof with the opening of the mold, the method including the provision of the aforesaid stock fi:ed passage means having a first portion movable with the first mold portion, a second portion movable with the second mold portion, and a movable connector stock feed passage portion being also movable relative to the mold portion wherein the movable connector is located in axially displaced relation therewith; providing axially compressible spring means securing the second stock feed passage means in secured pressing relation with the second mold portion; and closing the mold to apply a predetermined, limited resilient load between the first and the second stock passage means, to ensure a substantially uniform sealing connection therebetween, and to substantially preclude the application of significant bending-force moments in deforming, face opening, relation with the mold interface.

The movable connector may comprise a second portion thereof displaceable relative to the first portion in response to the pressure of fluent plastic therein, above atmospheric pressure. The movement of the second portion of the connector is initiated by spring means in force transmitting relation with the movable connector.

The method may further include the step of limiting by adjustment the pre-tension applied to the spring means, to control the ultimate load applied in securing relation between the first and second stock passage means, and to limit the deforming opening torque applied to the mold interface.

The combination thus provided comprises a stacked mold for use within a mold press, the mold having an axially centrally located stock distribution block flanked on each side by a mold block containing a pair of die molds positioned in mutual back to back relation, synchronized mold displacement means for simultaneously opening each of the aforesaid molds on completion of molding therein; stock distribution flow path passage means interconnecting the stock distribution block with the adjacent mold blocks and having a separable interface; relatively movable, pressure responsive passage extension flow connector means forming a part of the aforesaid passage means interface, being relatively movable towards the passage interface on the application against the extension means of fluid pressure of stock within the passage.

Thus, in a mold having the major central portion of the mold face occupied by a single large cavity, the present invention presents the capability of sprue-less stock feed, extending axially outside the mold central portion.

In this unusual arrangement an off-centre stock feeder may be connected to the mold block adjacent the press feed end. A stock feed gallery through that mold block connects with the second, (adjacent/adjoining) mold block, across a mold interface by way of a pin-less connector in accordance with the invention.

In the case of a 2-level stack mold, the second mold block comprises the central feed block, from which the symmetrical stock feeders extend in axially opposed, balanced relation.

Alternatively, a central stock feed to the first mold block may be connected by lateral gallery to an off-set, axially extending gallery that connects to the second mold block in the above-described fashion.

In the case of a 4-level stacked mold the off-set, axially extending feed gallery can extend across two mold interfaces, by way of the pin-less feed connectors of the present invention, into the central feed block.

The present invention thus provides a method of maintaining a substantially leak-free flow of plastic within a molding apparatus subject to rapid cyclic differential thermal expansion and contraction of the apparatus in opening and closing operation of the mold thereof, the mold having an internal flow passage for the feeding displacement of fluid plastic therethrough; the method including the step of providing a movable flow connector portion of the passage located in abutting, sealing relation with an adjoining passage portion, across an internal interface of the mold; applying a limited resilient mechanism pre-load to the movable passage portion in a direction tending to open the mold interface, in order to provide sealing contact during the operation of the mold in its closed condition; and restricting the action of the pre-load upon opening of the mold interface, to provide limited initial following movement of the connector portion into the opening gap.

The aforesaid method may further include subjecting a relatively movable second part of the movable flow connector to the pressure of the plastic therein so as to propel the flow connector portion in contact-maintaining relation with the adjacent flow passage portion beyond the initial displacement provided by the resilient pre-load.

The aforesaid method may be used in a molding apparatus wherein a portion of the plastic flow path containing the movable flow connector portion is located at a radially outer zone of the mold, in axially oriented relation thereto. In a preferred embodiment the method is applied to a mold having the movable flow connector portion radially outwardly spaced from the mold cavity being serviced thereby.

The method may include opening the feed connector upon the opening of the mold interface, wherein the displacement of the feed connector in contact-maintaining relation with the adjacent portion of the mold interface is automatically self-limiting, so as to substantially equalize the internal pressure of fluent plastic within the connector to atmospheric pressure, thereby automatically limiting the ingress of atmospheric air to the plastic flow passage.

In carrying out the foregoing method, the available volume of the stock flow passage adjoining the flow connector is increased, thereby automatically diminishing the pressure of plastic within the flow connector, prior to the opening of a gap to atmosphere.

In the above described mold there is a plurality of the separable mold interfaces, the method including providing a separable feed connector as above described at each of the interfaces where the feed path crosses the interface; the method including terminating the external supply of plastic to the mold; and simultaneously operating the separable feed connectors to cut off the passage of plastic into the interfaces as they open, thereby avoiding the occurrence of drool within the mold.

The method includes limiting the application of resilient mechanical loading to a predetermined maximum value so as to restrict the mechanical force acting at each interface in opposition to the applied press closure tonnage force, whereby the mold faces are substantially undeformed.

The method may include cooling a zone adjacent the feed connector, to diminish the fluidity of plastic adjacent the gap formed upon the opening of the interface.

The invention provides a mold for molding thermoplastic material and having a separable flow connector radially spaced from the polar axis of the mold, for feeding fluent feed stock to a cavity in the mold, the separable feed connector having an interface to contact an abutting interface of the mold in sealing relation therewith when in a closed condition, and to maintain the sealing contact for a limited portion of the opening between the interfaces on opening of the molds including mechanical compression means to apply a limited, predetermined axial load against the flow connector, with a limited bending moment force applied thereby across the interface.

In the preferred embodiment the flow connector comprises a hollow piston slidably mounted within a flow passage, for the axial passage of fluent plastic through the open hollow of the piston; one end of the piston being exposed to the fluid pressure of the plastic therein, to displace the flow connector in contact-maintaining relation with the aforesaid interface until the fluid pressure of the plastic becomes ineffective therefor.

The mechanical compression means comprises a spring in compressive relation with the flow connector, to urge the flow connector in sealing relation at the interface, and to initiate displacement of a second, relatively movable part of the flow connector in following relation with the adjacent mold block upon initial opening of the interface.

The use of additional cooling, such as water cooling, in the zone of the mold interface, on a cyclic basis is contemplated.

In a preferred embodiment this relative movement of the passage extension flow connector means has the effect of increasing the flow passage volume of the aforesaid conduit at a location downstream of the conduit interface, to thereby significantly reduce the fluid pressure prevailing within the conduit adjacent the aforesaid interface.

It is contemplated that under certain operating conditions the subject multi-level mold may be satisfactorily operated without the provision of resilient loading means to apply compressive force in sealing relation to the stock feed conduit interface or interfaces.

It is further contemplated that the presently disclosed pressure responsive passage extension means may be utilized at stock feed interfaces other than solely those of multi-level molds such as 2-level and 4-level stacked molds.

BRIEF DESCRIPTION OF THE DRAWINGS

Certain embodiments of the invention are described, without limitation of the invention thereto, reference being made to the accompanying drawings, wherein:

FIG. 1 is a schematic representation, in side elevation of a subject 4-level stacked mold;

FIG. 2 is a side view of the stacked mold of FIG. 1, showing the distribution channels;

FIG. 3 is a schematic representation in side elevation of the stock flow distribution system;

FIG. 4 is a schematic representation in side elevation showing a mold synchronization linkage with the mold in an open condition;

BEST MODE OF CARRYING OUT THE INVENTION

Figure 5:
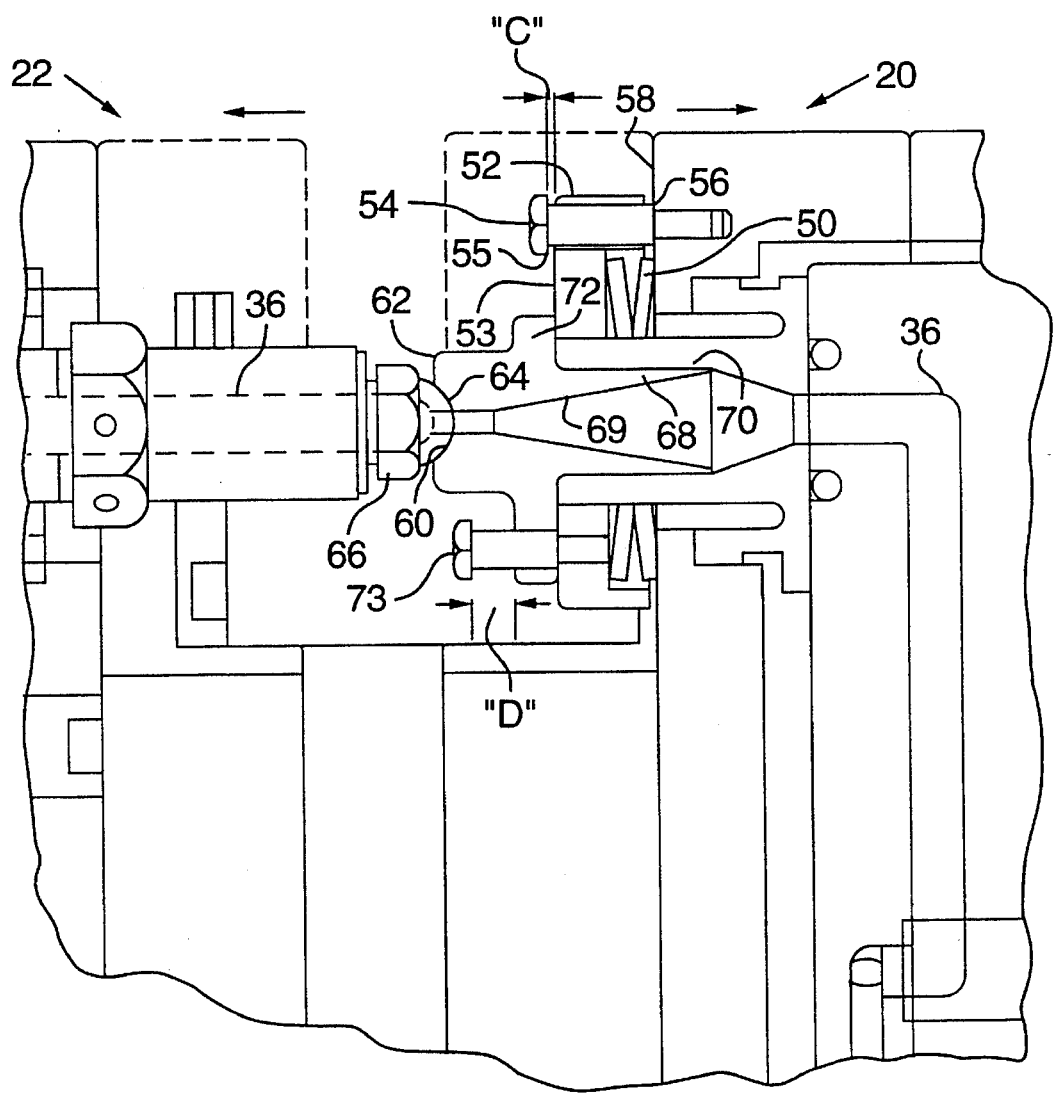
FIG. 5 is an enlarged portion, in diametrical sectioned side elevation, showing details of a feed flow interface connector, together with resilient expansion compensation means, with the mold closed.

Referring to FIGS. 1 and 2, an injection press 7 for molding thermoplastics has an injection head 8 with a movable platen 9 and a stationary platen 11, between which is mounted a mold 10, in accordance with the present invention.

The mold system 10 comprises a 4-layer stacked mold, sized to fit within a standard press, bearing against the mold pressure heads 12 and 14. A stock feeder connection 16 connects with the injector head 8 of press 7.

First and second back-to-back mold blocks 18, 20 are located respectively on opposite sides of a centrally located feed distributor block 22.

The distributor block 22 is dynamically mobile, in that it is connected by way of the feeder 32 and feeder connection 16 with the press injection head 8, and also with the secondary feeders 38, 40 when in the mold-closed condition. Upon opening of the mold the distributor block 22 becomes separated from the injection head 8 and also from the mold secondary feeders 38, 40 under control of the synchronizing mechanism (FIG. 4).

The mold system 10, shown in its closed, operative molding condition, upon completion of the stock injection phase opens axially, by separation between fixed platen 11 and movable platen 9, on opening of the press.

The platen 11 being fixed, the mold head 14 also remains stationary, and mold stack components 20, 18 and 12, together with the feed distributor block 22 are moved progressively leftwardly, as illustrated, so that the respective four mold interfaces 24, 26, 28 and 30 each opens equally, to an axial extent necessary to permit clear ejection of the molded components from their respective mold die cavities, while also causing separation of the stock feed paths from the feed block.

Synchronized axial displacement of the stacked mold components 12, 18, 20 and 22 in relation to the stationary platen 11 and pressure head 14 occurs on axially extending arbour bars (not shown), by way of the synchronizing linkage (FIG. 4).

Referring to FIGS. 2 and 3, the stock primary feeder 32 is of fixed length, and is located on the main or polar axis of mold 10.

The primary feeder 32 is secured to the centrally located distributor block 22, being attached at 16 to the stock feed pressure head 8 when the mold is closed, and separating therefrom when the mold 10 is opened. The feeder 32 extends in radially separated relation through mold block 20. Upon opening of the mold 10 axial separation of the mold components takes place.

Branch feed connections 34, 36 in distributor block 22 are off-set from the main axis of the mold, and connect respectively axially forwardly and rearwardly to respective mold feeders 38, 40 located in the respective mold blocks 18, 20.

The feeders 38, 40 in turn each branch axially forwardly and rearwardly within mold blocks 18, 20 to feed the respective multiple die cavities 42 within each of the mold blocks.

Each double mold 18, 20 has a respective pair of interfaces 28, 30, 24 and 26, where the respective molds open, i.e. where they "split".

Adjacent the mold interfaces 26, 28 there are located stock feeder interfaces which separate upon opening of the secondary feeders 38, 40 from the upstream stock feed supply 36.

Figure 6:
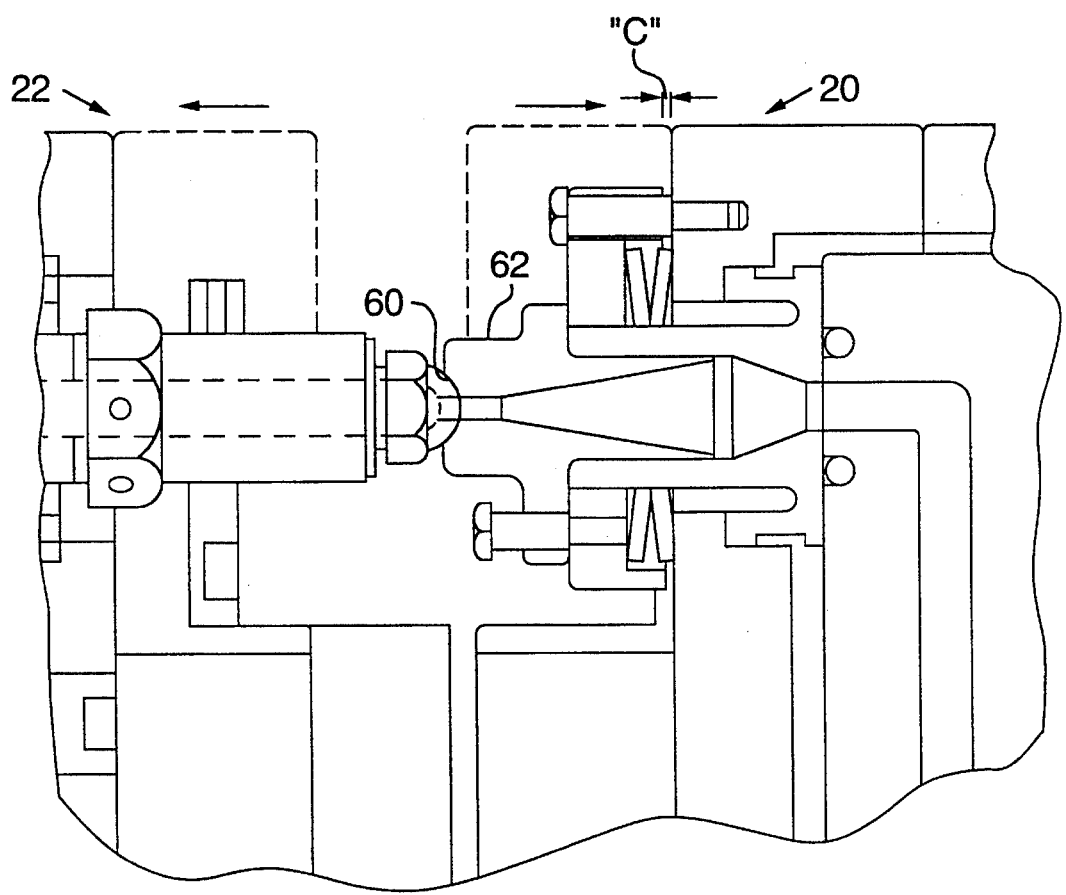
FIG. 6 is a view similar to FIG. 5, with the mold partially open.
Figure 7:
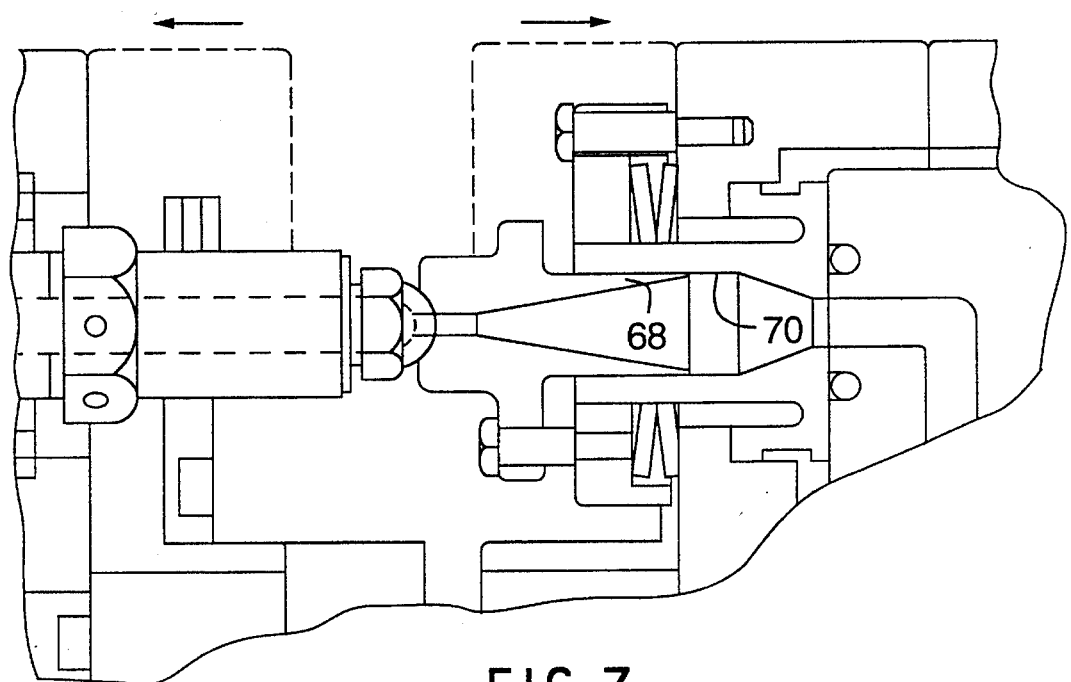
FIG. 7 is a view similar to FIG. 6, with the mold more fully open, and a stock feed interface about to separate.

One of the two stock feed interfaces is shown in detail in FIGS. 5, 6, 7 and 8. Referring to FIGS. 5, 6, and 7, in FIG. 5 the stock feed line 36 is shown in a fully closed condition.

Figure 9:
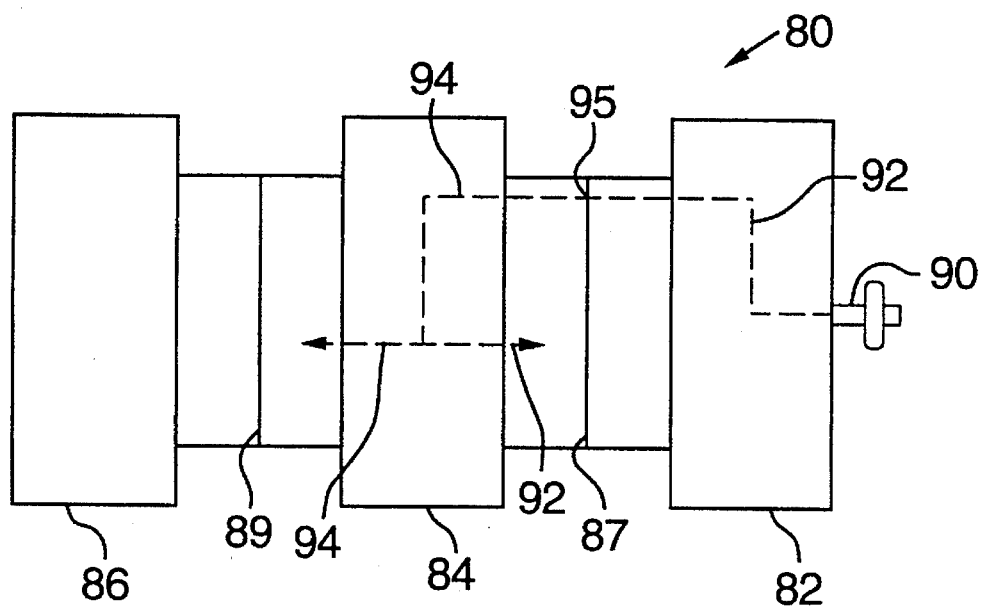
FIG. 9 is a schematic plan view of an off-set main stock feed having a transfer nozzle system in accordance with the invention in a 2-level mold.

Referring to FIG. 9, the 2-layer stacked mold 80 comprises a first mold block 82, a second, central mold block 84 and a third mold block 86, with opening interfaces 87, 89 between the blocks.

A stock feed 90 in mold block 82 is centred in usual fashion for a standard press set-up on the polar axis of the mold 80, and connects by lateral gallery 92 with a peripheral gallery 94 connecting with the central mold block 84, by way of a stock feed interface 95, as illustrated in FIGS. 5 through 8, above. This constitutes a sprue-less stock feed, thereby enabling the whole central areas of the mold to be occupied by mold cavities (not shown).

Symmetrical, balanced flow path feeders 92, 94 connect the central mold block 84 with the two mold cavities, as shown.

Figure 10:
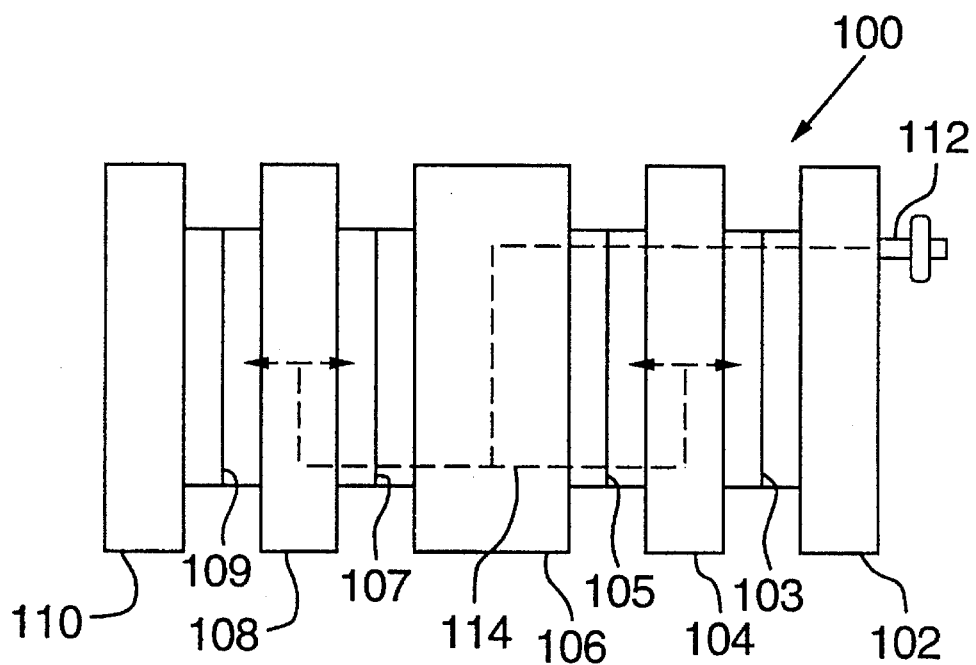
FIG. 10 is a view similar to FIG. 9 for an off-set main stock feed in a 4-level mold.

Referring to FIG. 10, the 4-level stack mold 100 has mold blocks 102, 104, 106, 108, 110; which are separated by separation interfaces 103, 105, 107 and 109.

A main stock feed 112, illustrated as being off-centre for a special purpose press, extends axially through the blocks 102, 106 and into the central distributer block 106. The main stock feed 112 crosses block interfaces 103, 105 by way of stock feed interfaces in accordance with the invention, as illustrated in detail in FIGS. 5 through 8.

The symmetrical, balanced stock distribution feed 114 is shown on the side of the mold 100 opposite from the main stock feed 112.

The distribution feed 114 crosses block separation interfaces 105 and 107 by way of stock feed interfaces in accordance with FIGS. 5 through 8 of the invention.

As in the case of the 2-level mold 80, the off-set main stock feed path 112 and off-set distribution feed 114 permits each of the central mold areas to be fully occupied by large area mold cavities (not shown), enabling the molding of maximum size components commensurate with the available press force tonnage.

It will be understood that the FIG. 10 mold may operate with a standard, polar axis stock feed inlet, by way of a lateral gallery, to transfer the feed outwardly in spaced relation from the polar axis, as in the FIG. 9 embodiment.

The operation of the feed passages at an elevated temperature, has rapid temperature variations taking place both during start-up and due to intermittent stock flow and changing operating conditions, with more gradual variations, in operation, of the more massive proportions of the mold 10.

In order to ensure leak-free closure at the feed passage interfaces a compressive, resilient pre-load may be furnished by Belleville springs washers 50. Illustrated are a pair of Belleville spring washers 50 in back-to-back relation within housing member 52, which serve also to maintain the interfaces secured in mutually compressive leak-free relation during the injection cycle, and serve also to prevent the occurrence of excessive and damaging forces that might otherwise cause galling at the contact faces and bending of the mold.

A set of capscrews 54 having shoulder portions 56 abutting the mold face 58, provide a clearance "C" between the face 53 of housing member 52 and the undersurface 55 of capscrew 54, of which only one is shown.

On unlocking of the press platens 9, 11 (FIG. 1) the portions of mold 10 move towards an open condition, under control of the synchronizing linkage of FIG. 4.

As the mold 10 opens, the Belleville spring washers 50 displace the face 53 of housing member 52 into compressed relation against the undersurface 55 of capscrew 54, thereby taking up the clearance "C".

This opening displacement advances the hemispherical face 60 of passage connector 62, to maintain it in sealing contact with the convex face 64 of feed connector 66, for the initial displacement "C".

The passage connector 62 has a barrel portion 68 slidably mounted in an enlarged passage portion 70 of the feed line 36, in the fashion of a piston 68 slidable in a cylinder 70.

The feed connector 62 has a flange portion 72 which abuts the face 53 of housing member 52.

A capscrew 73 is secured to the housing member 52 and permits displacement of passage connector 62 a distance "D" by way of a clearance "D"(FIG. 5).

The barrel piston portion 68 has an enlarged tapered bore 69, outwardly convergent. The application of internal fluid pressure thereagainst tends to displace the passage connector 62 outwardly in axial sliding displacement towards feed connector 66.

Thus, on opening of the mold 10, the initial opening displacement of connector 66 permits, the Belleville washers 50 to displace the passage connector 62 outwardly the distance "C", while providing initial acceleration to connector 66.

Further opening of the mold and displacement of feed connector 66 permits internal residual fluid pressure within bore 70 of "piston"68 to continue to act upon the bore 69, to drive the passage connector 62 outwardly, and maintain contact with the receding feed connector 66, until the clearance "D" is taken up as seen in FIG. 7, or more probably, until internal pressure diminishes to balance with atmospheric pressure.

Figure 8:
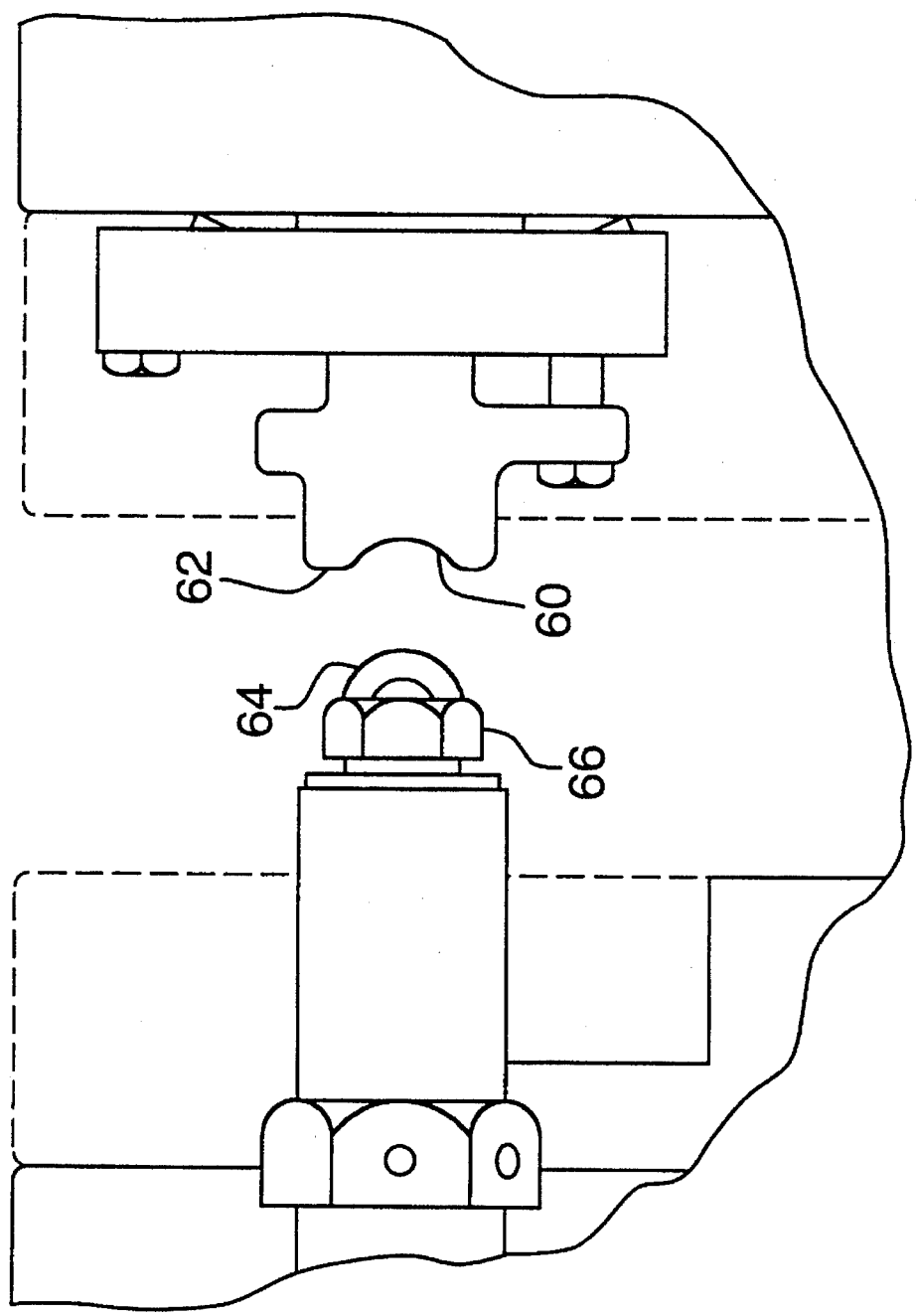
FIG. 8 is a scrap view of a portion of FIG. 7, showing separation of the stock feed interface.

This displacement of barrel portion 68 within enlarged passage portion 70 increases the internal effective volume of the flow passage 36 within mold portion 20, to progressively reduce the residual internal pressure, such that as the connector sealing faces 60, 64 finally separate, as shown in FIG. 8, there is no internal pressure to cause back-flow and spillage from the passage connector 62, the pressure having become effectively atmospheric.

It appears probable that the inductive pumping action of barrel portion (piston) 68 moving outwardly along passage portion 70, while sealing contact still exists between connector faces 60, 64, maintains flow momentum along the passage 36, to clear the immediate interface zone. As the sealing faces 60, 64 part, atmospheric air enters the parting interface, thereby cooling and tending also to stabilize fluent plastic contained therein against outflow into the developing gap. The use of a specific coolant flow provision such as water cooling gallery also is contemplated.

The initial action of the Belleville springs 50, in displacing the housing member 52 by taking up the clearance "C" imparts momentum to, and overcomes static friction of the second portion of the passage connector 62. The internal pressure of stock within flow passage 36 acting on the projected area of bore 69 tends to preserve the "piston" momentum of connector 62, in its displacement towards taking up the clearance "D". The increasing internal volume of the passage that is created by outward expansion of the connector 62 causes a corresponding reduction in the pressure of the fluent feed material present which reduces rapidly to atmospheric pressure, when the "piston" action is terminated, as a self-adjusting balanced action, to preclude the spillage of "drool" into the opening interface.

The pre-load applied by the springs 50 provides a force that is opposed to the applied press-force tonnage, thereby slightly diminishing the effective press loading. Due to the eccentric location of the passage connectors 62 excessive spring force is avoided, in order to minimise cross-face bending moments that tend to distort the mold.

It will be evident that certain characteristics and benefits of the present invention can be achieved in applying the invention to a 2-layer stacked mold, and in using the pin-less interface transfer for a sprue-less off-set stock-feed.

What is claimed:

1. The method of feeding a pressurized flow of plastic within a mold located in the mold space of a molding machine, said mold comprising a multi-level stacked mold having at least two levels of mold cavities in mutually stacked relation within axially separable mold blocks, comprising the steps of:

providing an internal flow passage within the mold located in radially off-set relation from the main axis of the mold, and extending through at least a portion of each of two separable adjoining mold blocks, including providing a sealing interface to said passage at the juncture of said mold blocks the flow passage having a first mold block portion and relatively axially movable second mold block portion; a first displaceable portion of said passage extending from one said mold block portion into abutting, sealing interface relation with a second portion of said passage located in the other said mold block portion to form said passage sealing interface at said juncture;

applying to said displaceable passage portion, with said mold in a closed condition, a limited resilient compressive force sufficient to seal said passage interface in a leak-free condition; said limited compressive force applying a correspondingly limited force to said mold, to leave said mold in a substantially undeformed condition;

passing molten plastic under pressure through said flow passage and past said passage interface to said mold cavities when in the closed condition;

terminating the flow of said plastic through said passage;

relieving the pressure of said plastic; and axially opening said passage interface upon the equalization of said plastic pressure to that of atmosphere.

2. The method as set forth in claim 1, said mold being subject to axial dimensional changes due:

to cyclic thermal expansion; and to axial shortening of said mold as a consequence of wear, and wherein said passage displaceable portion compensates for said axial dimensional changes, to maintain said passage sealing interface in a sealed condition during the injection of plastic under pressure, to fill plural cavity levels of the mold.

3. The method as set forth in claim 1, including the step of increasing the volume of said flow path adjacent said flow path interface, to substantially reach atmospheric pressure of said plastic therein, as said passage sealing interface opens.

4. The method as set forth in claim 1, wherein said step of applying said limited resilient compressive force includes the precompressing of spring means acting on said first displaceable passage portion, to limit the consequent forces applied thereby against the mold, to substantially avoid deformation of the mold and consequent drool or flash therefrom while providing sufficient compressive force to provide leak-free plastic flow during injection.

5. The method as set forth in claim 1, wherein said limited resilient compressive force is applied by a spring means.

6. The method as set forth in claim 5, wherein said limited resilient compressive force is supplemented by the application of pressure fluid to an expansible piston portion of said displaceable passage portion, in path extending relation therewith.

7. A method of operating a mold having a separable feed connector radially spaced from the mold main axis and opening to the air substantially simultaneously therewith, said feed connector feeding fluent thermoplastic feed stock to the mold when in a closed condition, including the steps of:

provifing a separable connection to the feed connector having a first connector portion, a second connector portion located in aligned relation adjacent said first portion, an axially movable third connector portion secured in sealed feed stock flow conducting relation with one of said connector portions, and resilient loading means to apply a limited load against said portion in use to connect said third portion in compressed relation with the other one of said connector portions in sealed, feed stock conducting relation therewith;

limiting said loading means to limit the loading moment applied by said third portion in deforming relation across the face of said mold;

opening the mold;

simultaneously displacing said first connector portion in gap increasing relation from said second portion; and displacing said third portion in gap bridging relation, to maintain said feed connector in instantaneous stock containing relation with said other connector portion while increasing the available internal flow volume of a portion of said stock feed flow path, whereby the feed stock therein is effectively depressurized while said gap is bridged, prior to the opening of said gap to the air.

8. The method as set forth in claim 7, including providing a fourth connector portion axially movable in an extending sense from said third portion, including the step of displacing said fourth portion by said third portion, and opening said gap when the local pressure of said feed stock becomes equal to atmosphere.

9. The method as set forth in Claim 7, wherein said mold has a plurality of separable mold feed interfaces, including providing a said separable feed connector at each said feed interface; and simultaneously operating said separable feed connectors, to substantially simultaneously cut off the supply of said thermoplastic feed stock to said mold cavities, thereby avoiding the occurrence of drool within said mold, while limiting the deforming forces acting on said mold as a consequence of varying mechanical forces acting at each said interface during the mold-closed portion of the molding cycle.

10. In a stacked mold having at least two levels of mold cavities in stacked relation, within axially separable mold blocks, an internal stock flow passage within the mold extending axially through at least a portion of each of two said mold blocks located in separable adjoining relation, said passage having a separable, sealing interface; the flow passage having a first portion in a first said mold block and a relatively axially movable second portion in a second adjoining said mold block; said passage first portion having a third displaceable portion extending from said mold block portion into abutting sealing interface relation with the passage located in the other, adjacent mold block portion, to provide said passage sealing interface; resilient compression means to apply a limited load against said displaceable passage portion, to extend it axially towards said second passage portion, said limited load securing said interface in sealed, non-drooling relation when the mold is closed while applying correspondingly limited eccentric, off-centre force to the mold, leaving the mold in a substantially undeformed condition; and maintaining said sealed, non-drooling relation as the mold commences to open.

11. The stacked mold as set forth in claim 10, said resilient compression means including spring means to maintain said sealing interface in closed sealing relation subsequent to the commencement of opening of the face of said mold.

12. The stacked mold as set forth in claim 11, including a fourth passage portion displaceable from said third passage portion in response to pressure of said plastic, to extend said sealing interface when the pressure of said plastic exceeds atmospheric pressure.

13. The mold as set forth in claim 12, said resilient compression means including spring means in compressive relation with said displaceable passage portion.

14. The mold as set forth in claim 13, said fourth passage portion including piston means axially displaceable by said plastic pressure in compressive loading of said passage fourth displaceable portion.

15. The mold as set forth in claim 14, said piston means comprising a hollow annular piston forming a portion of said flow passage.

16. The mold as set forth in claim 11, having a plurality of said passage third displaceable portions, each having a said sealing interface with an adjoining said mold block.

17. The mold as set forth in claim 11, said resilient compression means including compression spring means located in displacing relation with said displaceable third passage portion, to maintain said passage portions in mutually contacting, sealing relation during at least initial opening displacement of said mold.

18. The mold as set forth in claim 17, including piston and cylinder means comprising a hollow annular piston forming a fourth portion of said flow passage, said compression spring means initially maintaining said passage portions in mutually compressed relation; and serving to initially move said hollow annular piston to maintain sealing contact between said passage portions beyond said initial opening displacement of said mold.

19. The mold as set forth in claim 18, said hollow piston being displaceable relative to said third passage portion, in extending relation therewith on the application of fluent plastic at a pressure above atmospheric pressure, to maintain said passage in sealed relation until the pressure of said plastic falls to atmospheric pressure.

20. The mold as set forth in claim 11, wherein said mold is a multi-level mold having at least one said displaceable passage portion in stock feeding relation therein.

21. The mold as set forth in claim 13, wherein said mold is a 4-level mold having at least two of said displaceable passage portions in stock feeding relation therein.

22. The mold as set forth in claim 11, having two levels of mold cavities therein.

23. The mold as set forth in claim 11, wherein said mold stock flow passage is off-set from the main axis of the mold in a major portion of its length, to enable the provision of large die cavities encompassing the mold main axis.

* * * * *